(12) United States Patent
Hamburg et al.

(10) Patent No.: US 12,506,604 B2
(45) Date of Patent: Dec. 23, 2025

(54) LOW-LATENCY MULTI-KEY ENCRYPTION AND DECRYPTION ENGINE AND TECHNIQUES

(71) Applicant: Cryptography Research, Inc., San Jose, CA (US)

(72) Inventors: Michael Alexander Hamburg, 's-Hertogenbosch (NL); Evan Lawrence Erickson, Chapel Hill, NC (US); Helena Handschuh, Miami, FL (US); Mark Evan Marson, Carlsbad, CA (US)

(73) Assignee: Cryptography Research, Inc., San Jose, CA (US)

( * ) Notice: Subject to any disclaimer, the term of this patent is extended or adjusted under 35 U.S.C. 154(b) by 68 days.

(21) Appl. No.: 18/702,315

(22) PCT Filed: Oct. 18, 2022

(86) PCT No.: PCT/US2022/047031
§ 371 (c)(1),
(2) Date: Apr. 17, 2024

(87) PCT Pub. No.: WO2023/069441
PCT Pub. Date: Apr. 27, 2023

(65) Prior Publication Data
US 2025/0260568 A1    Aug. 14, 2025

Related U.S. Application Data

(60) Provisional application No. 63/262,718, filed on Oct. 19, 2021.

(51) Int. Cl.
*H04L 9/08* (2006.01)
(52) U.S. Cl.
CPC ................... *H04L 9/088* (2013.01)

(58) Field of Classification Search
CPC ........................................... H04L 9/088
See application file for complete search history.

(56) References Cited

U.S. PATENT DOCUMENTS

| | | | |
|---|---|---|---|
| 7,502,463 B2 * | 3/2009 | Qi ................... | H04L 9/0625 380/42 |
| 7,711,955 B1 * | 5/2010 | Olson ............... | H04L 9/0637 713/168 |

(Continued)

FOREIGN PATENT DOCUMENTS

| CN | 105379172 A | 3/2016 |
|---|---|---|
| EP | 1519509 B1 | 4/2017 |

OTHER PUBLICATIONS

Ghosh, Santosh et al., "A >100 Gbps Inline AES-GCM Hardware Engine and Protected DMA Transfers between SGX Enclave and FPGA Accelerator Device", IACR Cryptol. ePrint Arch. 2020 (2020): 178. 21 pages.

(Continued)

*Primary Examiner* — Darren B Schwartz
(74) *Attorney, Agent, or Firm* — Lowenstein Sandler LLP

(57) ABSTRACT

Disclosed systems and techniques involve low-latency multi-key encryption processing in which block keys are precomputed based on multiple cryptographic keys, stored, and then selected for encryption or decryption of data during run-time cryptographic operations. The block keys may be precomputed, for each cryptographic key, in such quantities that allow uninterrupted flow of encryption or decryption operations. Replacement block keys may be concurrently generated to replace the blocks being consumed and authentication values may be computed or updated. Various described techniques allow parallel processing for efficient low-latency block key generation and cryptographic operations.

16 Claims, 8 Drawing Sheets

(56) References Cited

U.S. PATENT DOCUMENTS

| | | | |
|---|---|---|---|
| 7,937,595 B1* | 5/2011 | Kumar | G06F 21/10 |
| | | | 713/192 |
| 8,600,049 B2 | 12/2013 | Gueron et al. | |
| 9,209,967 B2 | 12/2015 | Yup | |
| 9,264,222 B2 | 2/2016 | Chevallier-Mames et al. | |
| 11,316,667 B1* | 4/2022 | Katti | H04L 63/062 |
| 12,375,275 B2* | 7/2025 | Garcia Morchon | H04L 63/30 |
| 2002/0150240 A1* | 10/2002 | Henson | H04L 9/0618 |
| | | | 380/44 |
| 2004/0047466 A1* | 3/2004 | Feldman | H04L 9/0631 |
| | | | 380/37 |
| 2005/0190912 A1* | 9/2005 | Hopkins | H04L 9/3033 |
| | | | 380/44 |
| 2006/0002549 A1* | 1/2006 | Avasarala | H04L 9/0631 |
| | | | 380/44 |
| 2010/0027783 A1* | 2/2010 | Yup | H04L 9/0643 |
| | | | 380/44 |
| 2011/0261961 A1* | 10/2011 | Dharmaraju | H04W 12/041 |
| | | | 380/277 |
| 2019/0294811 A1* | 9/2019 | Damgård | H04L 9/085 |
| 2020/0396068 A1 | 12/2020 | Sarno et al. | |
| 2021/0083868 A1* | 3/2021 | Lee | G01R 31/318588 |
| 2021/0091928 A1* | 3/2021 | Dockser | H04L 9/0637 |
| 2022/0021517 A1* | 1/2022 | Ghosh | H04L 9/0637 |
| 2022/0066741 A1* | 3/2022 | Saarinen | G06F 21/72 |

OTHER PUBLICATIONS

Notification of Transmittal of the International Search Report and the Written Opinion of the International Searching Authority, or the Declaration with Mail Date May 4, 2023 re: Int'l Appln. No. PCT/US2022/047031. 10 pages.

* cited by examiner

LOW-LATENCY MULTI-KEY ENCRYPTION AND DECRYPTION ENGINE AND TECHNIQUES

RELATED APPLICATIONS

This is a 371 application of International Application PCT/US22/47031, filed Oct. 18, 2022, which claims benefit to U.S. Provisional Patent Application No. 63/262,718, filed Oct. 19, 2021, the contents of both are incorporated by reference in their entirety herein.

TECHNICAL FIELD

The disclosure pertains to cryptographic computing applications, more specifically to cryptographic engines and techniques that allow efficient low-latency encryption and decryption of data in applications where a particular cryptographic key has to be selected among multiple cryptographic keys and applied to encrypt or decrypt the data.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
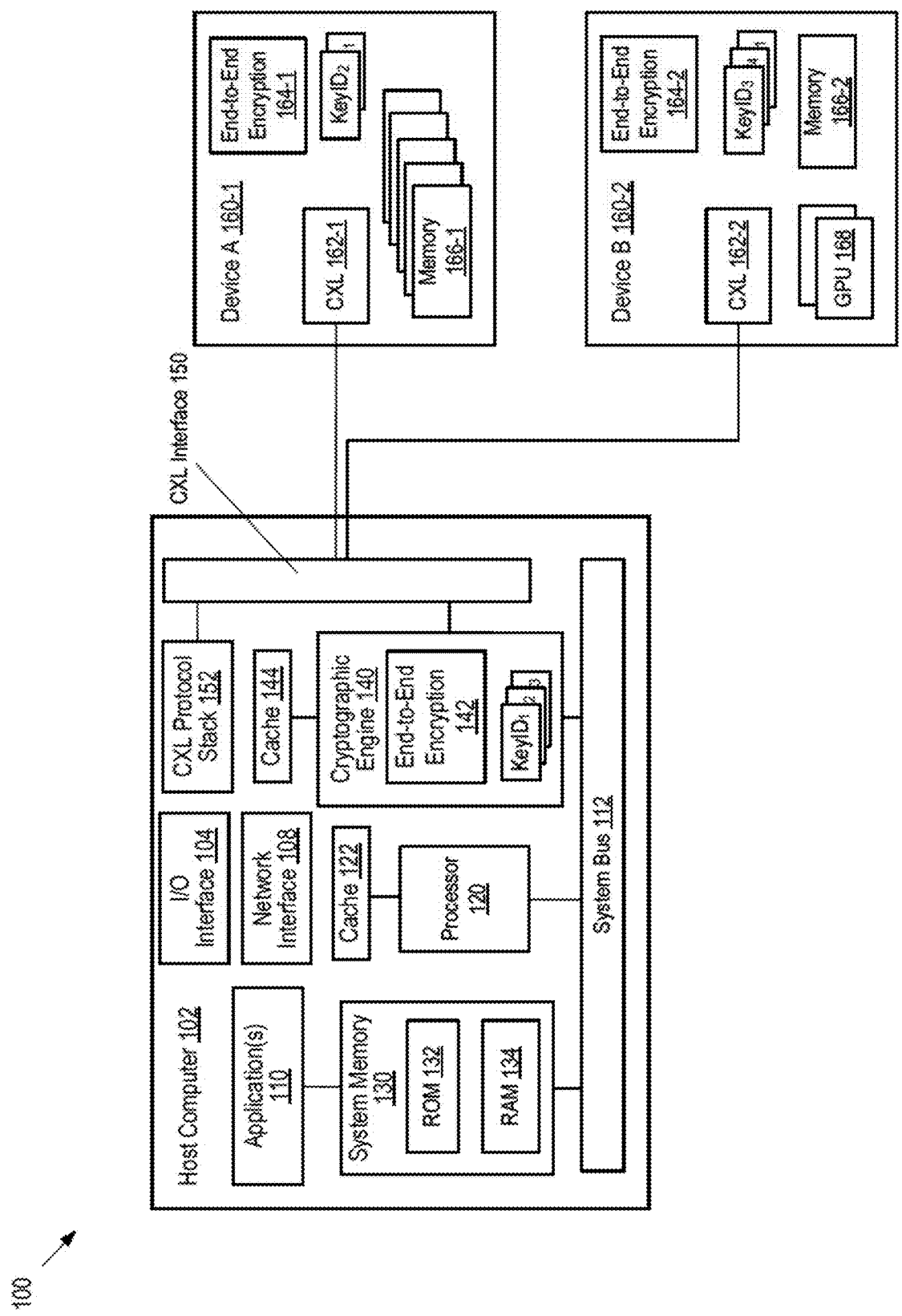
FIG. 1 is a block diagram illustrating an example system architecture in which implementations of the present disclosure may operate.

Aspects of the present disclosure are directed to efficient low-latency encryption and decryption operations in which a particular cryptographic key, out of a number of keys accessible to a cryptographic engine, is to be applied on the fly to encrypt a specific plaintext message or decrypt a specific ciphertext message. More specifically, aspects of the present disclosure are directed to techniques of encrypting (or decrypting) of multiple blocks of data in parallel, using a bank of block keys generated in advance and preloaded into memory. A number of block keys stored in the memory may be sufficient to enable an encrypting (or decrypting) pipeline to operate without interruption while one or more cipher engines are refilling the bank of block keys. Cryptographic engines operating in accordance with aspects of the present disclosure may use a combination of precomputing and generating, at run-time, block keys in such quantities that allow continuous low-latency cryptographic operations that may utilize different cryptographic keys.

Block ciphers operate by processing an input plaintext block of data (e.g., a 128-bit block or 256-bit block) together with a cryptographic key through a series of computations that produce an encrypted block (ciphertext). Stream ciphers operate by encrypting plaintext data bit-by-bit using bits of keys (e.g., added via an XOR operation) that are computed separately by a cryptographic cipher, which can be a block cipher engine. Cipher engines can include ciphers operating based on the 128-bit, 192-bit, or 256-bit Advanced Encryption Standard (AES) algorithms. Correspondingly, AES may use 10, 12, or 14 rounds of computations. Other examples include 3-Way, Kalyna, Kuznyechik, PRESENT, SAFER, SHARK, Square, Salsa20, and the like. In some applications, AES ciphers are used in conjunction with authentication code operations, which allow verification that encrypted data has not been manipulated, including by unauthorized actors.

A class of applications involves encryption of links between various interconnected devices, such as processors, accelerators, memory stores, etc., in a cache-coherent manner. An exchange of data (e.g., memory reads and writes) between such devices can be protected with cryptographic keys that can be different for various devices and for various links between the devices. For example, data exchanges between a central processing unit (CPU) and a graphics processing unit (GPU) can be protected with one key while data exchanges between the CPU and a memory storage can be protected with another key, and so on. In some implementations, such a multi-device interconnect may be a Compute Express Link (CXL), e.g., CXL 1.0 standard, CXL 2.0 standard, or an upcoming CXL 3.0 standard. CXL standards allow for cache coherent data exchanges between multiple processors and other devices. In some instances, data exchanges may occur via a CXL switch. A switch may receive a data obtained from a memory device, being encrypted with a key of the memory device. The switch may then decrypt the data using the memory device key and re-encrypt the data using a key of a destination CPU. Similarly, the data output by the CPU may be encrypted at the CPU end (using the CPU key) and then decrypted and re-encrypted (using the key of the memory device) by the switch before delivering the data to the memory device.

In some instances, it may be advantageous not to entrust the switch with various source and destination keys and to perform end-to-end encryption directly on source and destination devices. For example, the memory device may be capable of encrypting the data intended for different CPUs with different destination keys. The order of memory read requests, however, is often not known beforehand and various keys may need to be retrieved and applied on the fly. For security of data exchanges, it is often desirable to encrypt a block of data with a key that is unique for that block. Generation of such unique keys, however, may require a substantial processing time. For example, 128-bit, 192-bit, or 256-bit AES ciphers may use L=10, 12, or 14 cycles of computations (or more) to produce a key for a given destination (which may be one of many destinations).

Aspects and implementations of the present disclosure address these and other shortcomings of the existing technology by describing cryptographic engines and cryptographic techniques that are capable of producing an uninterrupted stream of correct keys that encrypt data intended for specific destinations (or data received from multiple sources). More specifically, an end-to-end (EE) cryptographic engine may have access to N cryptographic keys to encrypt (or decrypt) data intended for (or received from) a number of destinations (sources), which may be equal to N, greater than N, or even less than N (if a particular device uses multiple keys). In some implementations, the EE cryptographic engine may operate multiple, e.g., m, block cipher circuits, each cipher capable of outputting a block key per cycle, L cycles after the key material was input into the block cipher. Because of the L-cycle latency in generating new block keys, the EE cryptographic engine may precompute m×L block keys for each of N cryptographic keys, for a total of m×L×N precomputed block keys, prior to the start of cryptographic operations. Once a request for a block of data to be encrypted with a j-th cryptographic key identified with $KeyID_j$ is received by the EE cryptographic engine, an available block key previously generated using $KeyID_j$ is used to encrypt a respective block of plaintext data. At the same time, generation of a replacement block key may be started for the same $KeyID_j$, so that a new block key may be completed L cycles later. In this manner, even when all m encryption (or decryption) channels are to receive L consecutive requests to encrypt (or decrypt) m plaintext (ciphertext) blocks with the same $KeyID_j$ and the bank of m×L precomputed block keys (for this $KeyID_j$) is depleted, the next m block keys are output by the moment the stored block keys are used up. As a result, the EE cryptographic engine is never starved and the stream of ciphertext blocks is not interrupted.

Numerous implementations and modifications of these and other EE encryption techniques are described below. The advantages of the disclosed implementations include but are not limited to low-latency run-time encryption and decryption of data with any one of a plurality of keys that may be used by various sources or destinations of data.

FIG. 1 is a block diagram illustrating an example system architecture 100 in which implementations of the present disclosure may operate. The example system architecture 100 may include a desktop computer, a tablet, a smartphone, a server (local or remote), a thin/lean client, and the like. The example system architecture 100 may include a host computer 102, which may be any computing device, a server, a cloud computing node, a card reader, a wireless sensor node, an Internet-of-Things (IoT) node, an embedded system dedicated to one or more specific applications, and so on. One or more applications 110 may be executed on host computer 102. The system architecture 100 may include, but need not be limited to, a host computer 102 having one or more processors 120, e.g., CPUs, GPUs, field-programmable gate arrays (FPGA), application-specific integration circuits (ASICs), and the like. "Processor" refers to a device capable of executing instructions encoding arithmetic, logical, or I/O operations. In one illustrative example, a processor may follow Von Neumann architectural model and may include one or more arithmetic logic units (ALUs), a control unit, and may further have access to a plurality of registers, such as a cache 122.

Host computer 102 may have access to one or more system memory 130 devices. The system memory 130 may refer to any volatile or non-volatile memory and may include a read-only memory (ROM) 132, a random-access memory (RAM) 134, as well as (not shown) electrically erasable programmable read-only memory (EEPROM), flash memory, flip-flop memory, or any other device capable of storing data. RAM 134 may be a dynamic random-access memory (DRAM), synchronous DRAM (SDRAM), a static memory, such as static random-access memory (SRAM), and the like. In some implementations, processor(s) 120 and the system memory 130 may be implemented as a single controller, e.g., as a FPGA.

The system architecture 100 may further include an input/output (I/O) interface 104 to facilitate connection of the host computer 102 to various peripheral hardware devices (not shown) such as card readers, terminals, printers, scanners, IoT devices, and the like. The system architecture 100 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from host computer 102. Various hardware components of the host computer 102 may be connected via a system bus 112 that may include its own logic circuits, e.g., a bus interface logic unit (not shown).

Application(s) 110 supported by host computer 102 may include machine-learning application(s), graphics application(s), computational application(s), cryptographic application(s) (such as authentication, encryption, decryption, secure storage application(s), etc.), embedded application(s), external application(s), or any other types of application(s) that may be executed by host computer 102. Application(s) 110 may be instantiated on the same host computer 102, e.g., by an operating system executed by the processor 120 and residing in the system memory 130. Alternatively, the external application(s) 110 may be instantiated by a guest operating system supported by a virtual machine monitor (hypervisor) operating on the host computer 102. In some implementations, the external application(s) may reside on a remote access client device or a remote server (not shown), with the host computer 102 providing cryptographic support for the client device and/or the remote server.

The processor 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more application(s) 110, although more than one processor core (or a logical processor) may be assigned to a single application for parallel processing. A multi-core processor 120 may simultaneously execute multiple instructions. A single-core processor 120 may typically execute one instruction at a time (or process a single pipeline of instructions). The processor 120 may be implemented as a single integrated circuit, two or more integrated circuits, or may be a component of a multi-chip module.

Host computer 102 may include a cryptographic engine 140 for fast and efficient performance of encryption and decryption, as described in more detail below. Cryptographic engine 140 may include processing and memory components that are different from processor 120 and system memory 130. For example, cryptographic engine 140 may have access to high-speed cache 144. Cryptographic engine 140 may perform authentication of applications, users, access requests, in association with operations of application(s) 110 or any other applications operating on or in conjunction with the host computer 102. Cryptographic engine 140 may include EE encryption module 142 (which is to be understood to perform both EE encryption and EE decryption). During encryption operations, EE encryption module 142 may receive data from processor 120 or system memory 130 (e.g., via system bus 112), identify a destination device for the received data, select a specific KeyID used by the destination device, generate a ciphertext using the selected KeyID and provide the generated ciphertext to the destination device via CXL interface 150. Although, for concreteness, references herein are made to CXL, any other suitable protocol for secure cryptographic protection and data exchange may be used. Transmission of data via CXL interface may be controlled by a CXL protocol stack 152, which may include a CXL input/output protocol for device initialization and discovery, a CXL cache protocol for utilization of memory of a remote device by host computer 102, a CXL memory protocol specifying read and write commands in host-device communications, and the like.

CXL protocol stack 152 may facilitate data exchange between host computer 102 and one or more devices 160-$n$, such as device A 160-1 and device B 160-2. Each of the devices 160-$n$ may include a respective CXL module 162-$n$ for enabling data exchanges with host computer (and/or any other devices that are not explicitly shown in FIG. 1) and an EE encryption module 164-$n$ for performing low-latency encryption and/or decryption of transmitted and received data. Various devices 160-$n$ may provide different functionalities to host computer 102. For example, device A 160-1 may provide memory 166-1 for storing and reading data by processor 120 of host computer 102. Device B 160-2 may provide both memory 166-2 and GPU(s) 168, e.g., for execution of neural network operations or graphics processing operations of host computer 102.

In one illustrative example, host computer 102 may execute concurrently a computational simulation application and a neural network model, e.g., as two independent applications 110. In some instances, processor 120 may direct a first batch of data generated by the simulation application to device A 160-1 for storage in memory 166-1, direct a second batch of data (e.g., from system memory 130) generated by the neural network model to device B 160-2 for storage in memory 166-2, and direct a third batch of data to GPU 168. Cryptographic engine 140 may encrypt the first batch of data using $KeyID_2$ and direct the first batch to device A 160-1, encrypt the second batch of data using $KeyID_3$ and direct the second batch to device B 160-2, and encrypt the third batch of data using $KeyID_4$ and direct the third batch to device B 160-2. Low-latency encryption operations that are performed seamlessly to provide an uninterrupted stream of data to both device A 160-1 and device B 160-2 are described in relation to FIG. 2. After processing the third batch of data by GPU 168, device B 160-2 may encrypt the result with $KeyID_1$ (e.g., KeyID for host computer 102).

Figure 2:
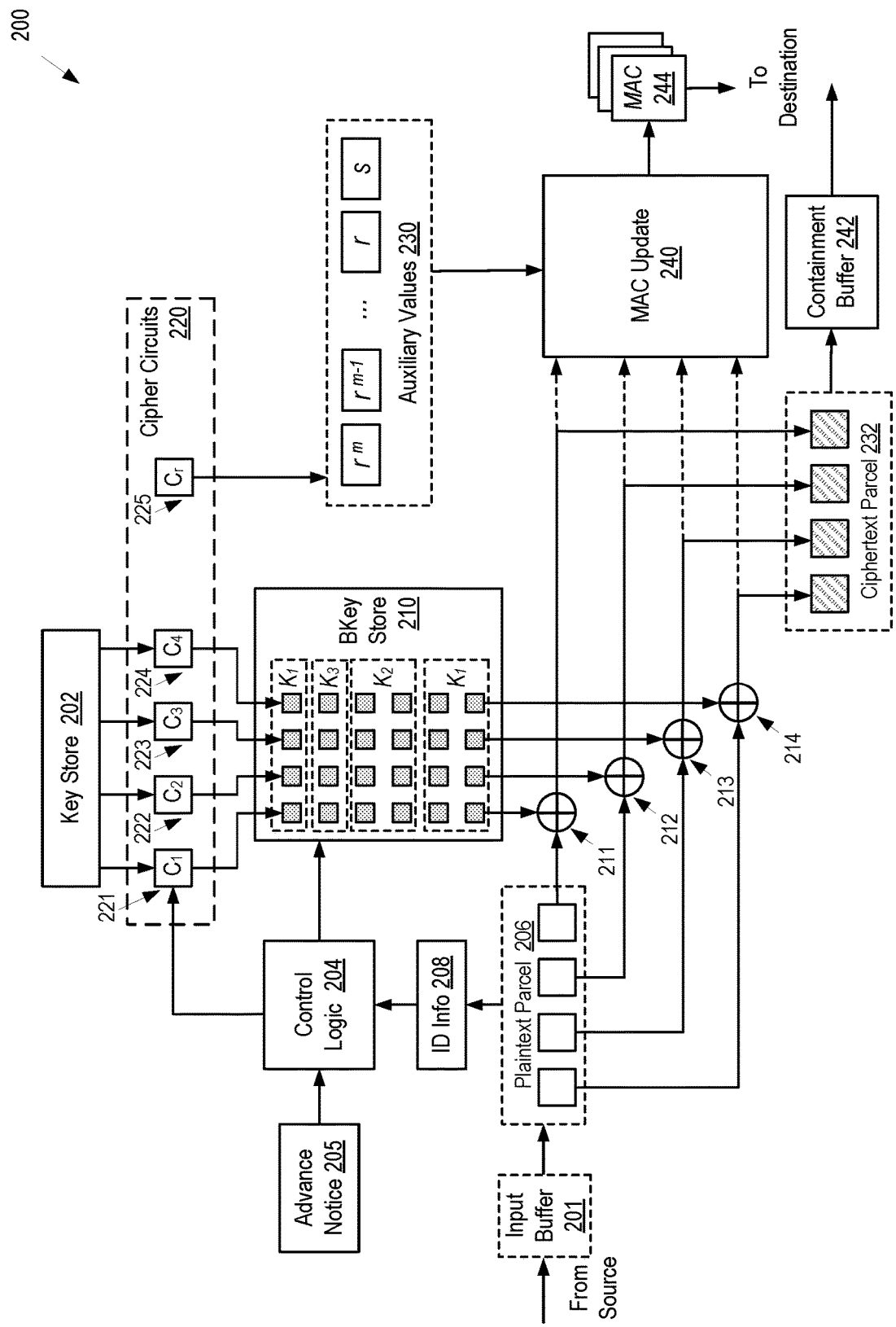
FIG. 2 is a block diagram illustrating example operations of a low-latency multi-key cryptographic engine that enables efficient end-to-end encryption and decryption, in accordance with some implementations of the present disclosure.

FIG. 2 is a block diagram illustrating example operations 200 of a low-latency multi-key cryptographic engine that enables efficient end-to-end encryption and decryption, in accordance with some implementations of the present disclosure. For concreteness, FIG. 2 illustrates encryption operations, but it should be understood that decryption operations may be performed similarly. Example, operations 200 can be performed by host computer 102 of FIG. 1 or any of the devices 160-$n$ communicating with host computer 102 (or with other devices 160-$n$). Example operations 200 may be performed by cryptographic engine 140, e.g., by EE encryption module 142. Cryptographic engine 140 may store multiple cryptographic keys in key store 202. Key store 202 may store cryptographic keys indexed by a KeyID of a respective key. Keys stored in key store 202 may be master keys for host computer 102, various devices 160-$n$, etc., or session keys that are generated (e.g., using a master key) for a particular application session or time epoch, and so on. Keys stored in key store 202 may be symmetric keys generated by a respective computer or device and provided to host computer 102 using asymmetric public-private key encryption. Key store 202 may further store other keying material (e.g., initialization vectors, nonce numbers, and the like).

Control logic 204 may be any combination of hardware circuits and/or software (or firmware) modules that is capable of identifying a type of a key to be applied to data provided by a data source (e.g., processor 120 or system memory of host computer 102), facilitating a retrieval or generation of an appropriate key, and applying the key to encrypt (or decrypt) the provided data. For example, a plaintext parcel 206 of data may be obtained from the data source. Plaintext parcel 206 may include a number, e.g., m, of blocks of data. Each block may include any number of bits, e.g., as prescribed by a specification of ciphers used by cryptographic engine 140, such as, 128 bits, 192 bits, 256 bits, 512 bits, etc. Blocks of plaintext parcel 206 may represent a flit or any portion of a flit. A flit may include a header that contains identification information (ID info) 208, which identifies the origin and/or destination of the data, and one or more blocks of data. The cryptographic engine can encrypt each of the received plaintext blocks based on ID info 208, as described in more detail below. The cryptographic engine can also generate a message authentication value, herein also referred as message authentication code (MAC), which is used (by the receiving device) for verifying that the encrypted data has not been subjected to external tampering. MAC value 244 may be updated upon encryption (or decryption) of each block.

More specifically, m plaintext blocks $PB_j$ (j=1 . . . m) may be received by the cryptographic engine, whose control logic 204 may also access ID info 208 with a destination (or source) of the received blocks (e.g., from a header of a flit to which the received blocks belong). Based on the ID info 208, control logic 204 may determine that the received blocks are to be encrypted (or decrypted) with keys associated with a particular KeyID, which, in turn, may be associated with a particular destination (or source) device that is to receive encrypted $\{PB_j\}$ (or decrypted plaintext blocks). Control logic 204 may retrieve m block keys $BK_j$ from a block key (BK) store 210. Using the retrieved block keys, m adder circuits (e.g., circuits 211-214) may perform, e.g., in parallel, encryption of plaintext blocks $\{PB_j\}$, e.g., by bitwise XOR addition of plaintext block $PB_j$ with the corresponding block key $BK_j$ to obtain a ciphertext block $CB_j$:

$$PB_j \oplus BK_j = CB_j.$$

The ciphertext blocks may be arranged in the same order, $CB_1$, $CB_2$ ... as the plaintext blocks $PB_j$ were arranged in plaintext parcel 206 to form a ciphertext parcel 232 that is subsequently communicated to a destination device.

In some implementations, block keys $\{BK_j\}$ may be precomputed by cipher circuits 220 that may include m or more cipher engines $C_j$ 221-224, which may be AES engines or any other suitable cryptographic engines. For example, cipher engines $C_1 \ldots C_m$ may be configured to populate block key store 210, e.g., both during run-time and prior to the start of the encryption operations. Each cipher engine $C_j$ may have latency L, which is the number of cycles that an input keying material has to be processed by a cipher engine before a block key BK is produced. Cipher engines $\{C_j\}$ may be capable of performing a pipelined processing, such that a new keying material is input into cipher engine $C_j$ during each cycle and a new block key BK is output by the cipher engine (with L-cycle latency).

At the start of the block key pipeline (e.g., upon booting host computer 102, or at a predetermined start time), control logic 204 may start a counter at some initial value $Counter_0$, which may be a zero value or any other value. Control logic 204 may further select a specific KeyID to be used to generate the block key BK. Control logic 204 may also select an initialization vector IV associated with the KeyID. The generated block key BK may then be used to encrypt or decrypt data that is intended for a device that uses this specific KeyID. The KeyID and the initialization vector IV may be known to both host computer 102 (e.g., source of the parcel) and another device (e.g., the destination of the parcel), which may generate the same block key BK used in both encryption and decryption.

The initialization vector IV may be concatenated with $Counter_{in}$ to form an initial input value $Y_{in}=IV||Counter_{in}$ into a cipher engine. Initial input value $Y_{in}$ may be 128-bit long or may have any other appropriate length. In some implementations, initial input value $Y_{in}$ may be processed by a separate cipher engine $C_r$ 225 (or multiple additional cipher engines) together with key K that is associated with the selected KeyID, $r=C_r(K, Y_i)$, to produce a hash subkey r, which may be used in MAC computations. Although a subscript r is used in the notation $C_r$ of the cipher engine 225 that generates the hash subkey, any other cipher engine of cipher circuits 220 may be used to compute the hash subkey. In addition to the hash subkey r, cipher circuits 220 may generate another auxiliary number s that may be used in MAC computations. Various auxiliary values 230 may be stored in cache 144 or any other memory device. Auxiliary values 230 may include (but need not be limited to) s, r, and various powers of r.

The initial input value $Y_{in}$ may be incremented to obtain an updated input value, $Y_0=Y_{in}+1$. This may be performed by incrementing counter value $Counter_0=Counter_{in}+1$ and concatenating the incremented counter value $Counter_0$ to the initialization vector IV. In some implementations, the updated value may be determined using some other deterministic function, $Y_0=f(Y_{in})$. The updated input value may then be processed together with key K, to produce the second value $s=C_s(K, Y_0)$. The auxiliary value s may be produced by the same cipher engine that produced the hash subkey r or by any other cipher engine.

Additional updates of the input value, $Y_{j-1} \to Y_j$, may then be performed to generate j-th block key $BK_j$: $BK_j=C_j(K, Y_j)$. As depicted in FIG. 2, m cipher engines may generate m block-keys in parallel. For example, during a first cycle, m cipher engines $C_1 \ldots C_m$ may begin generating m block keys $BK_1 \ldots BK_m$ (to be completed within L cycles). During a second cycle, m cipher engines may begin generating the next m block keys $BK_{m+1} \ldots BK_{2m}$, and so on. During preloading of block key store 210, the cipher engines may produce m×L block keys for each KeyID. In some implementations, the cipher engines may produce m×L block keys for each combination of the KeyID and the initialization vector. This may provide encryption support for devices that use the same KeyIDs but different initialization vectors. In some implementations, for faster generation of block keys $BK_j$, the cryptographic engine may have additional cipher engines (e.g., more than m cipher engines that are used for run-time replenishment of block key store 210).

Such preloading of block key store 210 ensures that even in a situation where L consecutive plaintext data blocks arrive that need to be encrypted with the same KeyID, block key store 210 has a sufficient reserve of block keys to be used in encryption (or decryption) of the arrived plaintext data blocks before the L-cycle computation of new m block keys is completed by cipher engines $C_1 \ldots C_m$. In those instances where all m blocks of plaintext (or ciphertext) arrive for encryption (or decryption) with a particular KeyID, control logic 204 uses m precomputed blocks from block key store 210 while causing cipher engines $C_1 \ldots C_m$ to initiate production of m block keys based on the KeyID. In other instances, where m' arrived blocks are to be encrypted (or decrypted) with $KeyID_1$ whereas m-m' blocks are to be encrypted (decrypted) with $KeyID_2$, control logic 204 uses m' block keys associated with $KeyID_1$ and m-m' block keys associated with $KeyID_2$ and orders production of the respective numbers of block keys by cipher engines $C_1 \ldots C_m$.

In some implementations, control logic 204 may have an advance notice 205, e.g., A cycles in advance, that m ciphertext blocks are coming up for encryption with a particular KeyID. In such implementations, cipher engines $C_1 \ldots C_m$ may generate a reduced number of block keys prior to the start of cryptographic operations, e.g., (L−A)×m block keys per each KeyID (or per each combination of KeyID and initialization vector, as described in more detail below). In such implementations, cipher engines $C_1 \ldots C_m$ may start generating another set of m block keys when advance notice 205 arrives indicating that m block keys for a specific KeyID will be needed after A cycles.

In addition to utilizing block keys from block key store 210 and generating replacement keys, example operations 200 may include using a MAC update stage 240 to generate and/or update the MAC value 244 with each new encrypted ciphertext block $CB_j$ (or decrypted plaintext block $PB_j$) or a parcel of such blocks. In some implementations, MAC value 244 is updated using a combination of XOR additions (bit-wise modulo 2 additions) and multiplications. In some implementations, the multiplications may be defined as polynomial multiplications over Galois fields $GF(2^n)$ with n elements. For example, if ciphertext block size is 128 bits (or 256 bits, etc.) the multiplication may be over Galois field $GF(2^{128})$ (or $GF(2^{256})$, etc.). In some implementations, after p blocks of data have been encrypted, the MAC value may be computed as follows:

$$MAC = CB_1 \cdot r^p \oplus CB_2 \cdot r^{p-1} \oplus \ldots \oplus CB_p \cdot r \oplus s.$$

This MAC value should be understood as illustrative but non-limiting. Various other MAC values may be used to authenticate a series of ciphertext blocks $CB_1 \ldots CB_p$ encrypted by the cryptographic engine 140 operating in accordance with implementations of the present disclosure. For example, any additional authentication data and/or any representation of the length of ciphertext blocks (or authentication data) may be included into one or more of the monomials of the MAC value.

The MAC value can be computed using sequential multiplications, parallel multiplication, or a combination thereof. For example, if sequential multiplication is being used, the first m ciphertext blocks may be authenticated by computing $$MAC = (\ldots ((CB_1 \cdot r + CB_2) \cdot r + CB_3) \cdot r + \ldots + CB_m) \cdot r + s,$$

where the addition sign may indicate bitwise XOR addition, for compactness of subsequent notations. During authentication of additional ciphertext blocks $CB_j$, the MAC value may be computed iteratively. For example, after n batches of m ciphertext blocks have been authenticated, the cryptographic engine may authenticate the next batch of m blocks by performing the following operations on the partial MAC value MAC'=MAC+s (conversely, the full MAC value may then be restored using MAC=MAC'+s):

$$MAC'(n+1) =$$
$$(\ldots ((MAC'(n) + CB_{mn+1}) \cdot r + CB_{mn+2}) \cdot r + \ldots + CB_{m(n+1)}) \cdot r.$$

The cryptographic engine performing operations 200 may include a containment buffer 242 for temporarily storage of data that may not yet be ready to be processed or transmitted, as described in more detail below.

Figure 3A:
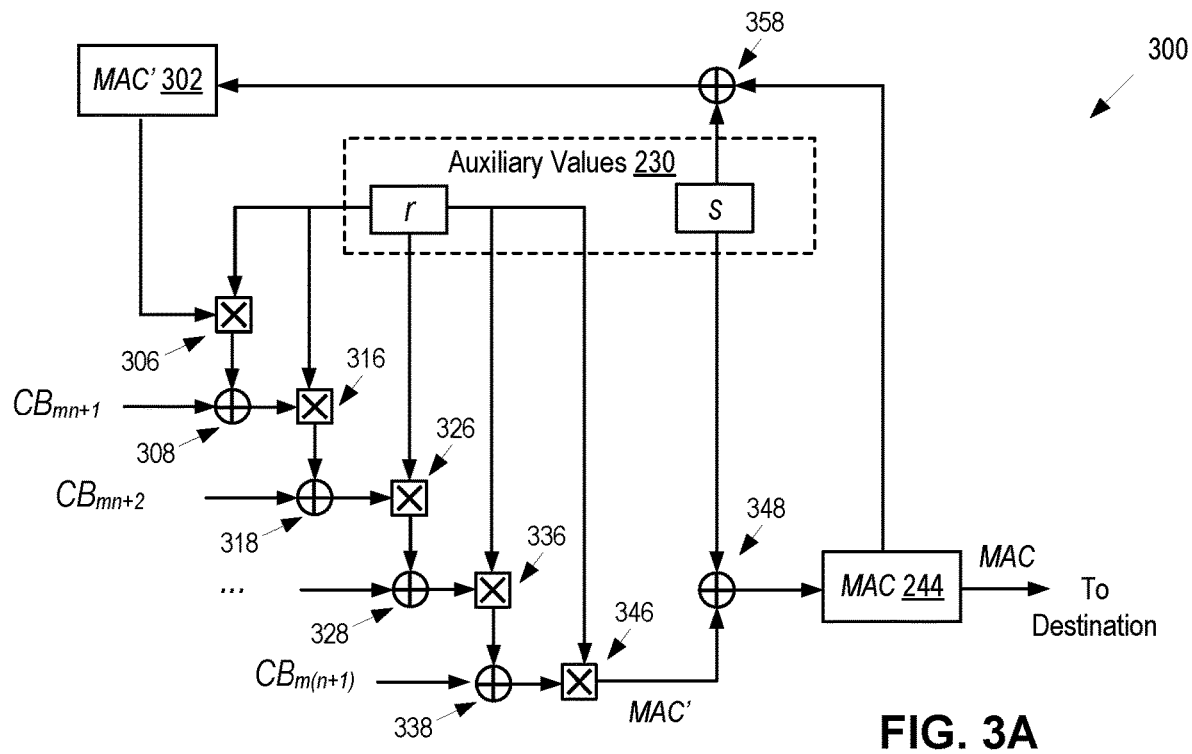
FIG. 3A depicts sequential operations performed to compute and/or update a message authentication code (MAC) value, in accordance with some implementations of the present disclosure.

FIG. 3A depicts sequential operations 300 performed to compute and/or update the MAC value, in accordance with some implementations of the present disclosure. Depicted is a partial MAC value MAC' 302, which may be stored in system memory 130 of FIG. 1 (e.g., RAM 134) or cache 144 (e.g., flip-flop memory), for faster read and write access operations. Precomputed auxiliary values 230 may also be stored in cache 144, e.g., r and s. As depicted, a series of m+1 multiplication operations 306-346 (indicated by squares with crosses) and m addition (e.g., XOR addition) operations 308-338 may be used to update value MAC'. In some implementations, multiplication operations 306-346 may be modular multiplication operations. In some implementations, all multiplication operations 306-346 may be performed by the same multiplication circuit and all addition operations 308-338 may be performed by the same addition circuit. The updated partial MAC value MAC' is an output of multiplication operation 346. One more addition operation 348 may add s to the partial MAC value MAC' to obtain the updated MAC value 244, MAC=MAC'+s. The updated MAC value 244 may be output to the destination (e.g., together with a sequence of computed ciphertext blocks CB) at predetermined times, e.g., after every N-th ciphertext block CB. The updated partial MAC value 302 may be obtained by another addition (subtraction) MAC'=MAC+s and stored in the memory or cache. In some implementations, the last two addition operations 348 and 358 are performed only during cycles when the MAC value is scheduled to be output to the destination whereas during other cycles, only the partial MAC value MAC' is computed and stored.

In some implementations, more than one multiplication circuit may be used to compute the MAC value (of the partial MAC value MAC'). For example, if two multiplication circuits are used, one of the multiplication circuits may perform m/2 multiplications in the course of collecting contributions of odd-numbered ciphertext blocks, $$MAC'_1(n+1) =$$
$$(\ldots ((MAC'_1(n) + CB_{mn+1}) \cdot r^2 + CB_{mn+3}) \cdot r^2 \ldots + CB_{m(n+1)+1}) \cdot r^2,$$

whereas the other multiplication circuit may perform remaining m/2 multiplications in the course of collecting contributions of even-numbered ciphertext blocks, $$MAC'_2(n+1) =$$
$$(\ldots ((MAC'_2(n) + CB_{mn+2}) \cdot r^2 + CB_{mn+4}) \cdot r^2 \ldots + CB_{m(n+1)+1}) \cdot r^2,$$

The partial MAC value MAC' value may then be obtained using one additional multiplication, $$MAC'(n+1) = MAC'_2(n+1) + MAC'_1(n+1) \cdot r.$$

This allows two-way parallel computation of the MAC value. The power $r^2$ may be precomputed and stored as part of auxiliary values 230. Similar N-way parallel computations may be performed, with each of one of N separate multiplication circuits performing m/N multiplications per parcel of data.

In some implementations, N=m multiplication circuits may be used. Specifically, the cryptographic engine may precompute m powers of the hash subkey, $\hat{R}=(r^m, r^{m-1} \ldots r)$ and compute the initial MAC value (that authenticates the first m blocks according to, $$MAC'(n+1) = \vec{CB}_{1\ldots m} \cdot \hat{R}^T,$$

using the vector product of vector $\hat{R}$ and vector of ciphertext blocks $\vec{CB}_{1\ldots m}=(CB_1 \ldots CB_m)$. Each term $r^j \cdot CB_j$ in the vector product $\vec{CB}_{1\ldots m} \cdot \hat{R}^T$ may be computed by a separate multiplication circuit (using m multiplication circuits in total) and the products may then be added using $\log_2 m$ rounds of pairwise additions using m/2 XOR adder circuits. An additional round may be used to add value s. Similarly, after n batches of m ciphertext blocks have been authenticated, the cryptographic engine may authenticate the next batch of m blocks by performing the following operation:

$$MAC'(n+1) = MAC'(n) \cdot r^m + \vec{CB}_{mn+1\ldots m(n+1)} \cdot \hat{R}^T,$$

where the vector $\vec{CB}_{mn+1\ldots m(n+1)}=(CB_{mn+1} \ldots CB_{m(n+1)})$.

Figure 3B:
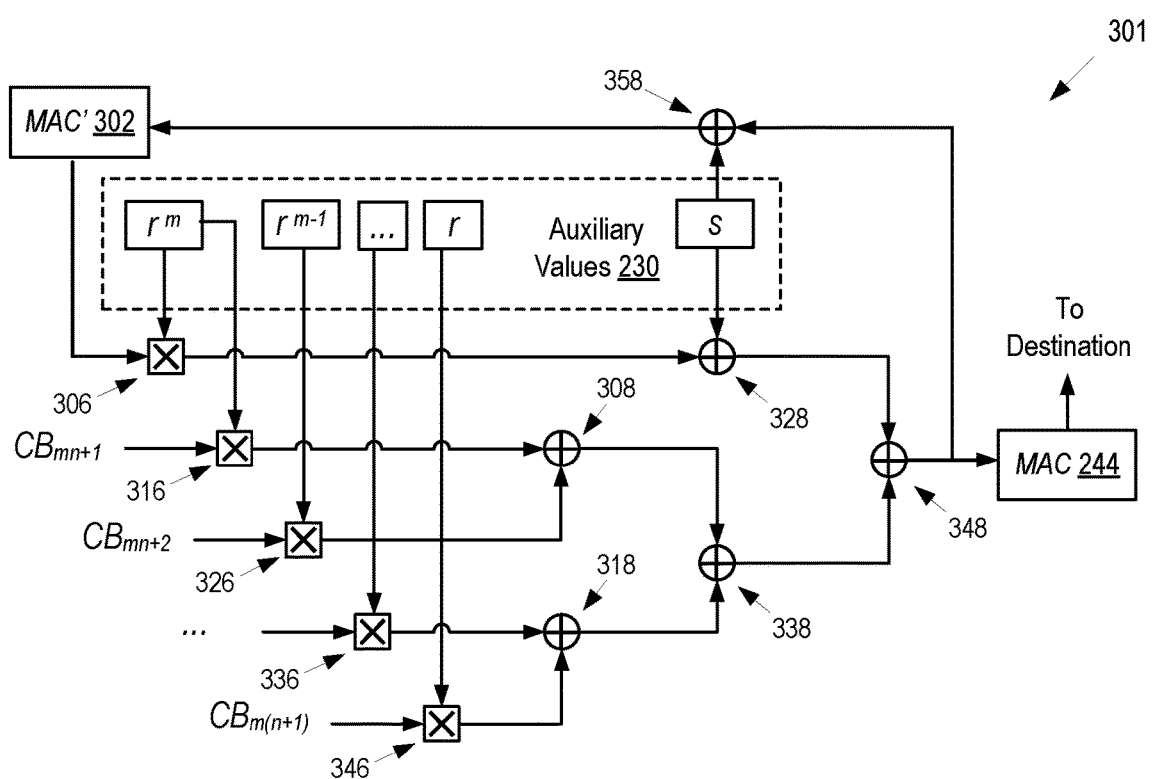
FIG. 3B depicts a sequence of parallel operations performed to compute and/or update the MAC value, in accordance with some implementations of the present disclosure

FIG. 3B depicts a sequence of parallel operations 301 performed to compute and/or update the MAC value, in accordance with some implementations of the present disclosure. Depicted is a stored partial MAC value MAC' 302. Precomputed auxiliary values 230, e.g., $r^m \ldots r$, and s may also be stored in cache 144 (or RAM). As depicted, a series of m+1 multiplication operations 306-346 may be performed in parallel, e.g., by m+1 different multiplication circuits. For example, multiplication operation 306 computes the product MAC'·$r^m$, multiplication operation 316 computes the product $CB_{mn+1}$·$r^m$, multiplication operation 326 computes the product $CB_{mn+1}$·$r^{m-1}$ and so on, until the last multiplication operation computes the product $CB_{m(n+1)}$·r. Subsequently, m/2 addition circuits may perform pairwise additions of the computed products, e.g., first round operations 308 and 318, second round operations 328 and 338 (and so on, as needed). Addition operations 308 and 328 (and operation 358) may be performed by the one addition circuit and addition operations 318, 338, and 348 may be performed by a different addition circuit. The updated MAC value 244 may be output to the destination (e.g., together with a sequence of computed ciphertext blocks CB) at predetermined times, e.g., after every N-th ciphertext block CB. The updated partial MAC value 302 may then be obtained by another addition (subtraction) MAC'=MAC+s (operation 358) and stored in memory or cache. In some implementations, the addition operations 348 and 358 are performed only during cycles when the MAC value is scheduled to be output to the destination whereas during other cycles, only the partial MAC value MAC' is computed and stored.

Referring again to FIG. 2, in the course of encryption operations, ciphertext parcels 232 may, in some implementations, be stored in containment buffer 242, e.g., when a destination device is not yet ready to receive ciphertext parcels 232. In some implementations, copies of transmitted ciphertext parcels 232 may be stored temporarily in containment buffer 242, until the data is successfully received by the destination device. If a notification of a lost data is communicated by the destination device, the cryptographic engine performing operations 200 may retransmit the copies of those ciphertext parcels 232 stored in containment buffer 242 that were lost in transmission.

In the course of decryption operations, containment buffer 242 may store decrypted plaintext parcels. In a streaming mode, plaintext blocks may be used as soon as such blocks are obtained (decrypted), without waiting for the MAC value to be received from a source device. In a more secure containment mode, decrypted plaintext blocks may first be quarantined in containment buffer 242 until the MAC value is received and determined to match the MAC value 244 computed by MAC update stage 240 on the receiving device.

In some implementations, control logic 204 may keep track of the number of encrypted ciphertext parcels 232 (or a number of encrypted ciphertext blocks). When the number of encrypted packets (or blocks) reaches a threshold number, control logic 204 may cease incrementing further the current value of the initialization vector IV and may begin using a new value of the initialization vector. The new value may be a randomly-generated value, a precomputed (and stored) value retrieved from a memory device, e.g., system memory 130, cache 144, or the like.

In some implementations, multiple MAC values 244 may be stored. Different MAC values may be associated with different cryptographic keys and/or different initialization vectors. After ciphertext blocks are encrypted with block keys corresponding to a particular cryptographic key, control logic 204 may cause a respective MAC value 244 to be accessed, updated, and communicated together with the encrypted block keys.

In some implementations, additional cipher engines (e.g., in excess of m cipher engines used for run-time replenishment of block key store 210) may be deployed to prepopulate block key store 210 when a change of the initialization vector is upcoming, e.g., when an unexpected change of a MAC epoch, connection of a new device, instantiation of a new application, or any similar change necessitates the use of new block keys that have not been previously computed. For example, control logic 204 may receive an indication that, within a certain number of cycles, the initialization vector IV is going to be replaced (or updated). Control logic 204 may provide the new value of the initialization vector to the additional cipher engines and direct these cipher engines to start generating block keys based on the new value of the initialization vector.

In some implementations, the change of the initialization vector may occur (e.g., at the direction of external processor, such as processor 120) without a sufficient notice for the additional cipher engines to finish the L-cycle generation of the new block keys. In such instances, control logic 204 may output an error message (e.g., fault message to processor 120), which may serve as a request to resend the data (plaintext blocks or ciphertext blocks). The control logic 204 may continue outputting the error message until at least some of the new block keys are generated and loaded into block key store 210. In some implementations, when new block keys are not yet available, the cryptographic engine may use an input buffer 201 to store the input data for the number of cycles that are sufficient for the cipher engines to produce a first batch of the new block keys. In some implementations, the cryptographic engine, e.g., control logic 204, initiates storage of input parcels in the input buffer 201 and does not notify processor 120 that a delay in the processing is about to occur. In some implementations, control logic 204 notifies processor 120 that a delay for a certain a number of cycles is about to occur. After receiving the notification, processor 120 begins directing the input parcels to the input buffer 201. In some implementations, notification of processor 120 may be performed by withholding link credits from processor 120 and, therefore, causing processor 120 to delay transmission of the input parcels to the cryptographic engine.

FIGS. 4-7 are flow diagrams depicting illustrative methods 400-700 of low-latency multi-key encryption and/or decryption, in accordance with one or more aspects of the present disclosure. Methods 400-700 and/or each of their individual functions, routines, subroutines, or operations may be performed by a cryptographic processor (accelerator), such as cryptographic engine 140 depicted in FIG. 1 or a general-purpose processor (such as processor 120 in FIG. 1) of host computer 102 or various cryptographic engines/processors of other devices (e.g., devices 160-n in FIG. 1). Various blocks of methods 400-700 may be performed in a different order compared with the order shown in FIGS. 4-7. Some operations may be performed concurrently with other operations. Some operations may be optional. Methods 400-700 may be implemented as part of a cryptographic operation, e.g., an operation that utilizes symmetric key cryptography. In some implementations, methods 400-700 may be performed as part of execution of any other application, to ensure security of data communications between host computer 102 and devices 160-n. Encryption and/or decryption of data performed during execution of methods 400-700 may use any AES algorithm, Salsa20 stream encryption algorithm, ChaCha stream encryption algorithm, or any other suitable encryption/decryption algorithm. The encryption/decryption algorithms may include message authentication, e.g., AES-GCM authentication, Poly1305-AES authentication, or any other similar secure message authentication. In some implementations, at least some operations of methods 400-700 may be performed in parallel, each parallel thread executing one or more individual functions, routines, subroutines, or operations of the methods. In some implementations, parallel threads implementing methods 400-700 may be synchronized (e.g., using semaphores, critical sections, and/or other thread synchronization mechanisms). Alternatively, threads implementing methods 400-700 may be executed asynchronously with respect to each other. Various operations of methods 400-700 may be performed in a different order compared with the order shown in FIGS. 4-7. Some operations of methods 400-700 may be performed concurrently with other operations. In some implementations of methods 400-700, one or more operations shown in FIGS. 4-7 are not performed.

Figure 4:
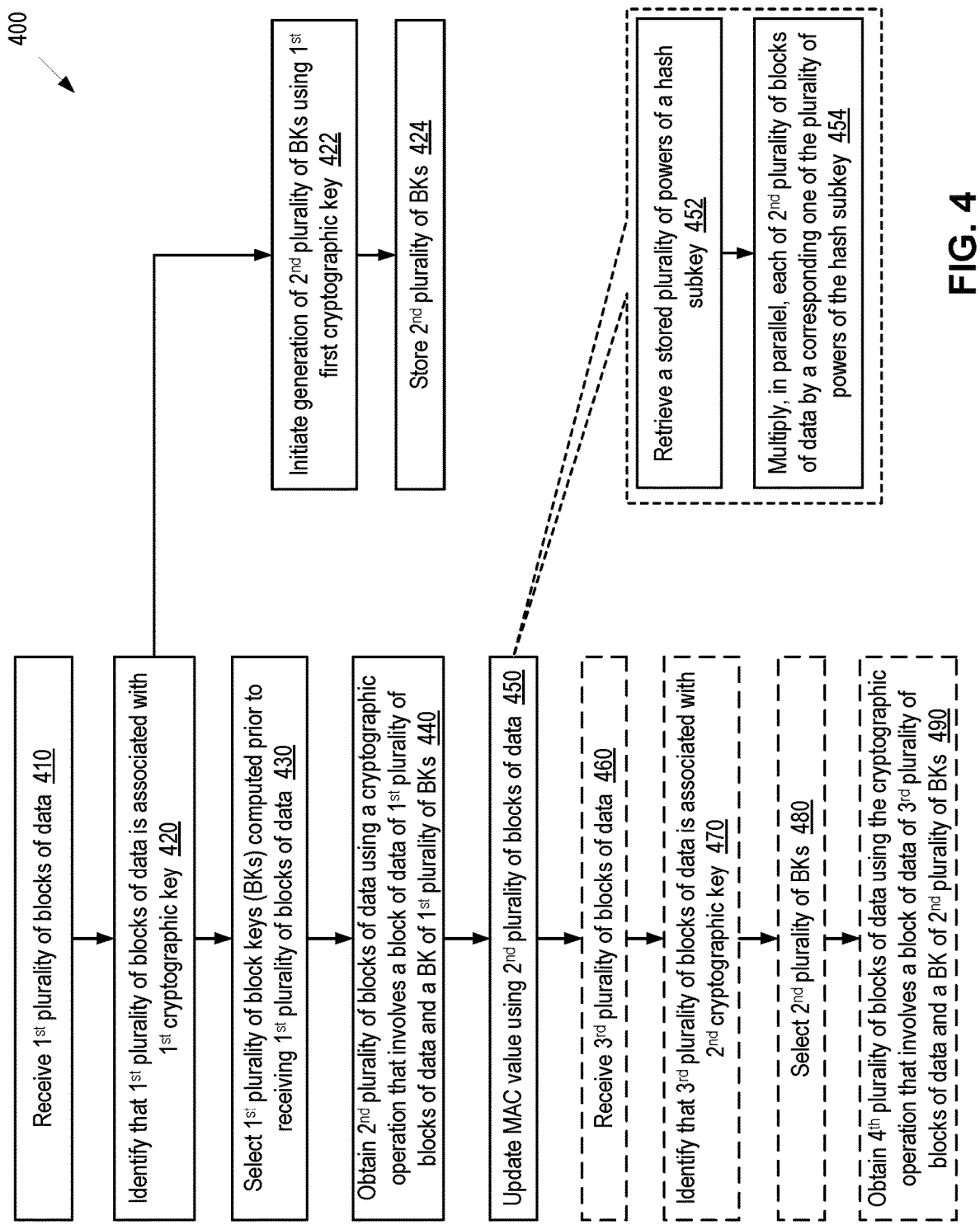
FIG. 4 is a flow diagram depicting a method of low-latency cryptographic operations that use multiple keys, in accordance with one or more aspects of the present disclosure.

FIG. 4 is a flow diagram depicting method 400 of low-latency cryptographic operations that use multiple keys, in accordance with one or more aspects of the present disclosure. In some implementations, the cryptographic operation is an encryption operation or a decryption operation, e.g., a stream encryption/decryption operation that involves addition (e.g., bitwise XOR addition) of a block of data to a unique block key, which is used for encryption of that specific block of data and not reused for other blocks of data. At block 410, a processing logic, e.g., a processor, cryptographic engine or accelerator, etc., that perform method 400 may receive a first plurality of blocks of data (e.g., plaintext parcel 206 in FIG. 2). At block 420, the processing logic may identify that the first plurality of blocks of data is associated with a first cryptographic key $K_1$. It should be understood that the terms "first," "second," "third," etc., are used herein as identifiers and do not presuppose a specific order.

In the context of decryption operations, association of the blocks of data with cryptographic key $K_1$ may mean that the blocks of data are encrypted with block keys that are obtained based on cryptographic key $K_1$. In the context of encryption operations, association of the blocks of data with cryptographic key $K_1$ may mean that the blocks of data are to be encrypted with block keys that are obtained based on cryptographic key $K_1$. For example, the blocks of data may be scheduled to be provided to device 160-1, which uses key cryptographic $K_1$ for encryption/decryption of data. Identification that the first plurality of blocks of data is associated with the first cryptographic key $K_1$ may be performed by accessing a header information associated with the blocks of data, e.g., as part of the parcel of blocks, a flit of blocks, etc.

At block 422, method 400 may continue with the processing logic initiating generation of a second plurality of block keys using the first cryptographic key. For example, the processing logic may initiate generation of block keys in response to identifying that the first plurality of blocks of data is associated with the first cryptographic key. Accordingly, the second plurality of block keys may be a replacement for the first plurality of block keys that are to be used to encrypt (decrypt) the first plurality of blocks of data. At block 424, method 400 may include storing the generated second plurality of block keys in the memory store (e.g., block key store 210).

At block 430, the processing logic may select a first plurality of block keys from a memory store. The memory store may store block keys (depicted with shaded squares in FIG. 2) computed using various keys $K_1, K_2, K_3 \ldots$ For example, the memory store may store at least the first plurality of block keys computed using the first cryptographic key $K_1$ and a second plurality of block keys computed using a second cryptographic key $K_2$. In some implementations, each of the first (second/etc.) plurality of block keys was obtained by an AES cipher and has a block key size of 128 bits, but various other block key sizes (e.g., 192 bits, 256 bits, etc.) may also be used (e.g., with Rijndael ciphers, and the like). Each of the first plurality of block keys and each of the second plurality of block keys may have been precomputed, e.g., computed prior to receiving the first plurality of blocks of data. For example, prior to receiving the first plurality of blocks of data, the memory store may store at least m×L block keys computed using the first cryptographic key $K_1$, m×L block keys computed using the second cryptographic key $K_2$, and so on. Here, m denotes the number of blocks of data in the first plurality of blocks of data and L denotes a number of cycles used to generate the second plurality of block keys, e.g., 10, 12, 14, etc. cycles, for 128-bit, 192-bit, or 256-bit AES ciphers, respectively. In some implementations, more than m×L block keys may be precomputed for each or at least some of the cryptographic keys $K_j$. For example, a subgroup of m×L block keys may be precomputed for each of a plurality of initialization vectors for the first cryptographic key $K_1$, and at least some other keys $K_j$.

At block 440, method 400 may include obtaining, by the processing logic, a second plurality of blocks of data (e.g., ciphertext parcel 232). Each of the second plurality of blocks of data may be obtained using a cryptographic operation (e.g., XOR additions 212-218) that involves a block of data of the first plurality of blocks of data and a block key of the first plurality of block keys. At block 450, method 400 may include updating (or creating) a message authentication value (e.g., MAC value) using each of the second plurality of blocks of data. More specifically, as depicted with the callout portion of block 450, method 400 may include (block 452) retrieving a stored plurality of powers of a certain value r, referred herein to as a hash subkey, e.g., powers $r \ldots r^m$, and multiply (block 454), in parallel, each of the second plurality of blocks of data by a corresponding one of the plurality of powers of the hash subkey. It should be understood that updating (or creating) the message authentication value may include further multiplication and addition operations, as described above in connection with FIG. 3A or FIG. 3B.

Operations of blocks 410-440 may be repeated for subsequent blocks of data. For example, method 400 may include (block 460) receiving a third plurality of blocks of data, identifying (block 460) that the third plurality of blocks of data is associated with the second cryptographic key $K_2$, selecting (block 480) the second plurality of block keys from the memory store; and obtaining (block 490) a fourth plurality of blocks of data. Each of the fourth plurality of blocks of data may be obtained using the cryptographic operation that involves a block of data of the third plurality of blocks of data and a block key of the second plurality of block keys. For an encryption operation, the fourth plurality of blocks of data may be ciphertext blocks corresponding to the plaintext blocks of the third plurality of blocks of data. For a decryption operation, the fourth plurality of blocks of data may be plaintext blocks corresponding to the ciphertext blocks of the third plurality of blocks of data. The second cryptographic key $K_2$ may be associated with a device (e.g., device B 160-2) that is different from a device (e.g., device A 160-1 or host computer 102) associated with the first cryptographic key $K_1$.

Similarly to how a (first) MAC value is updated or created using the second plurality of blocks of data, a second MAC value may be updated using the fourth plurality of the blocks of data. The second MAC value (a third, MAC value, etc.) may be stored separately from the first MAC value and updated only when blocks of data are to be encrypted/ decrypted using block keys that are associated with the second cryptographic key $K_2$. A MAC value (for a given cryptographic key) may be updated until one of MAC-resetting events occur: a new (e.g., incremented) initialization vector is used in conjunction with the cryptographic key, a certain number of blocks of data has been encrypted (e.g., a certain number of blocks of data or parcels of blocks of data has been communicated), a specific instruction to start a new MAC value has been received (e.g., from an application that produces blocks of data), and so on.

Figure 5:
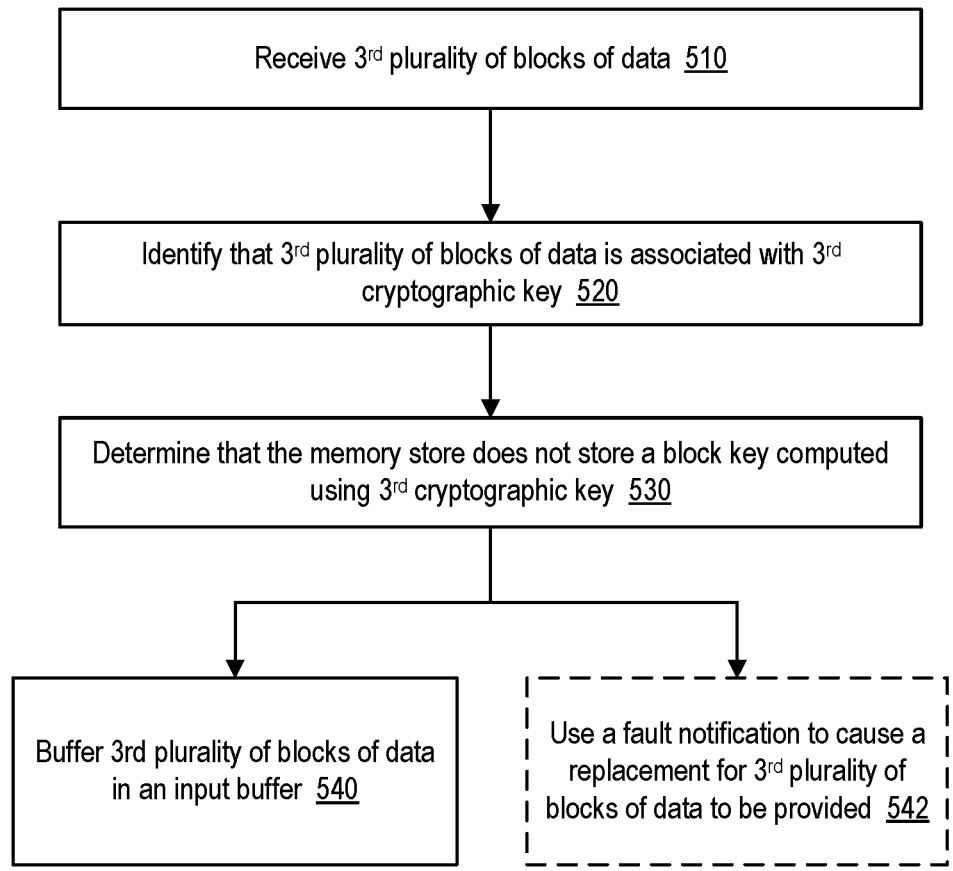
FIG. 5 is a flow diagram depicting a method of cryptographic operations that use multiple keys in the instances where no precomputed block keys of a specific type are available, in accordance with one or more aspects of the present disclosure.

FIG. 5 is a flow diagram depicting method 500 of cryptographic operations that use multiple keys in the instances where no precomputed block keys of a specific type are available, in accordance with one or more aspects of the present disclosure. In some implementations, method 500 may include receiving, at block 510, blocks of data, which are referred herein to as a third plurality of blocks of data. At block 520, method 500 may include identifying that the third plurality of blocks of data is associated with a third cryptographic key. At block 530, method 500 may continue with the processing logic determining that the memory store does not store a block key computed using the third cryptographic key (or stores an insufficient number of block keys computed using the third cryptographic key). In some implementations, method 500 may continue with the processing logic buffering, at block 540, the third plurality of blocks of data in an input buffer (e.g., input buffer 201 in FIG. 2) until a first group of m block keys is produced by cipher engines (e.g., cipher engines 221-225). In some implementations, method 500 may include using (at block 542) a fault notification to cause a replacement for the third plurality of blocks of data to be provided. For example, the fault notification may be communicated to processor 120, which sends the replacement blocks in response. In some instances, the replacement blocks may arrive before the block keys are generated. In such instances, another fault notification may be communicated. In some implementations, some combination of blocks 540 and 542 may be performed. For example, one (or any other predetermined number) of fault notifications may be output before subsequent replacement blocks are buffered in the input buffer.

Figure 6:
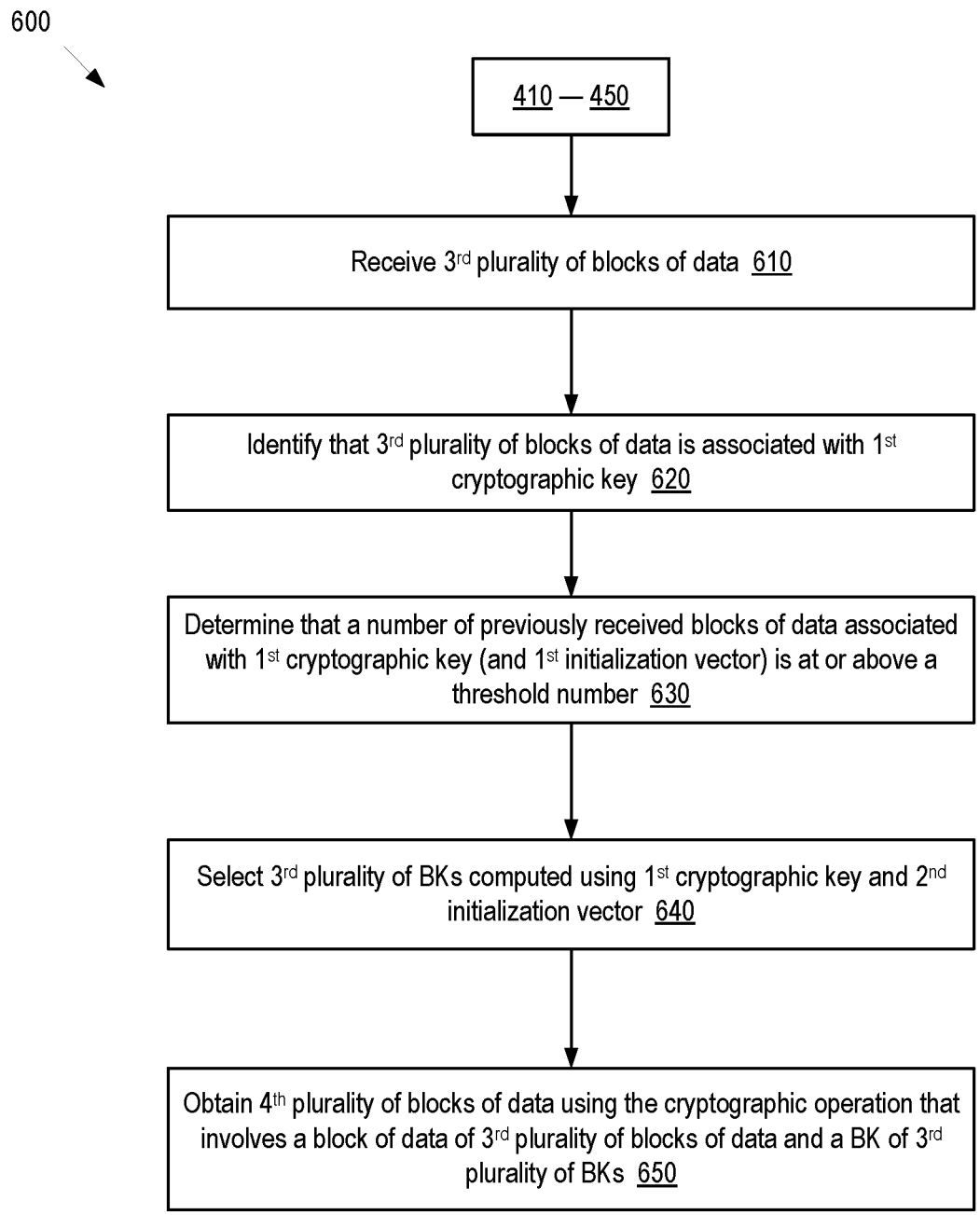
FIG. 6 is a flow diagram depicting a method of using multiple initialization vectors during low-latency cryptographic operations that use multiple keys, in accordance with one or more aspects of the present disclosure.

FIG. 6 is a flow diagram depicting method 600 of using multiple initialization vectors during low-latency cryptographic operations that use multiple keys, in accordance with one or more aspects of the present disclosure. In some implementations, method 600 may include performing at least some blocks of method 400, e.g., some or all blocks 410-450, which include using the first plurality of block keys to obtain encrypted (or decrypted) data. In some implementations, the first plurality of block keys was computed using the first cryptographic key $K_1$ and a first initialization vector $IV_1$. Method 600 may then include receiving, at block 610, a third plurality of blocks of data. At block 620, the processing logic performing method 600 may include identifying that the third plurality of blocks of data is associated with the first cryptographic key $K_1$ and, at block 630, determining that the number of previously received blocks of data associated with the first cryptographic key $K_1$ is at or above a predetermined threshold number. In some implementations, the number of the previously received blocks of data may be calculated by keeping track of the number of previously received parcels or flits that have been encrypted using block keys associated with the first cryptographic key $K_1$ and a first initialization vector $IV_1$. At block 640, method 600 may continue with selecting a third plurality of block keys from the memory store, wherein each of the third plurality of block keys was computed using the first cryptographic key $K_1$ and a second initialization vector $IV_2$. In some implementations, the second initialization vector $IV_2$ may be obtained (or may have been obtained previously) by incrementing the first initialization vector, $IV_2=IV_1+1$. In some implementations, the second initialization vector may have been obtained using some other function of the first initialization vector. At block 650, method 600 may continue with the processing logic obtaining a fourth plurality of blocks of data. Each of the fourth plurality of blocks of data may be obtained using the cryptographic operation that involves a block of data of the third plurality of blocks of data and a block key of the third plurality of block keys.

Figure 7:
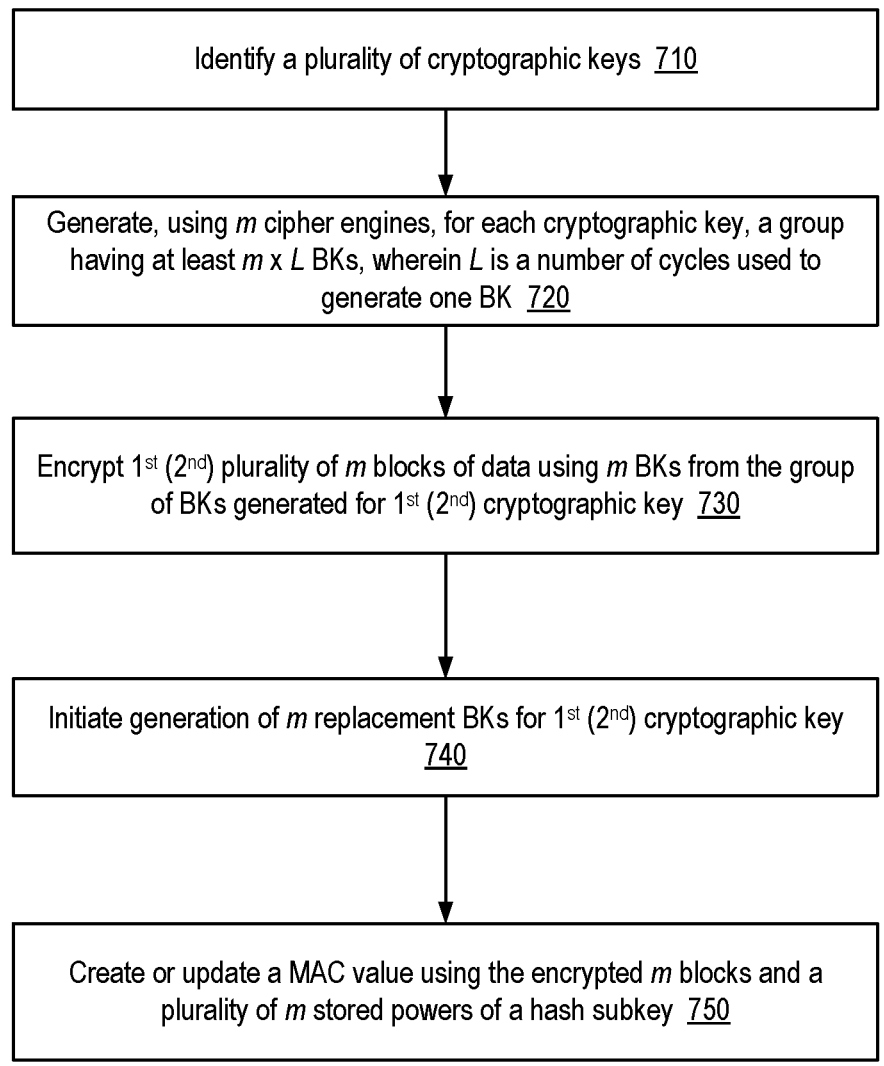
FIG. 7 is a flow diagram depicting a method of precomputing block keys using multiple cryptographic keys for low-latency cryptographic operations, in accordance with one or more aspects of the present disclosure.

FIG. 7 is a flow diagram depicting method 700 of precomputing block keys using multiple cryptographic keys for low-latency cryptographic operations, in accordance with one or more aspects of the present disclosure. In some implementations, method 700 may include identifying, at block 710, by a processing logic, a plurality of cryptographic keys 720. For example, the host computing device may identify cryptographic keys $K_1 \ldots K_n$ used by various devices connected to the host computing device (as well as cryptographic keys that are used by the host computer itself). At block 720, method 700 may continue with generating, using a plurality of m cipher engines, for each of the plurality of cryptographic keys $K_1 \ldots K_n$, a group of block keys that includes at least m×L block keys. In some implementations, the group of block keys generated for the first (second, etc.) cryptographic key $K_1$ ($K_2$, etc.) may include at least a subgroup of m×L block keys for each of a plurality of initialization vectors $IV_1$, $IV_2$, ..., etc. At block 730, method 700 may include using the generated block keys. For example, the processing logic may encrypt (or decrypt) a first plurality of m blocks of data using m block keys from the group of block keys generated for a first cryptographic key $K_1$ of the plurality of cryptographic keys. At block 740, method 700 may continue with the processing logic initiating generation of m replacement block keys for the first cryptographic key $K_1$. At block 750, method 700 may continue with creating or updating a message authentication value using the encrypted first plurality of m blocks and a plurality of m stored powers of the hash subkey r.

Figure 8:
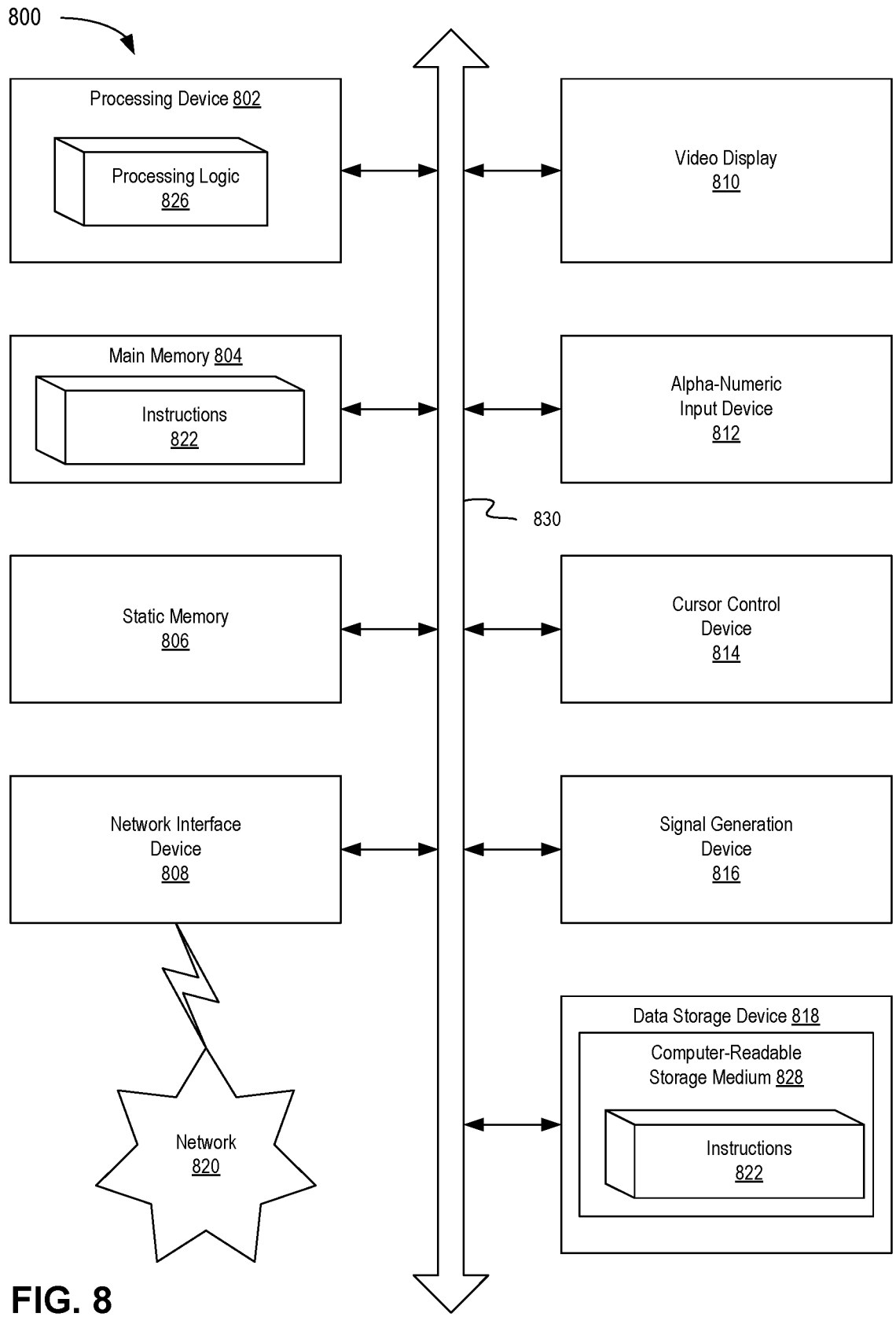
FIG. 8 depicts a block diagram of an example computer system operating in accordance with one or more aspects of the present disclosure.

FIG. 8 depicts a block diagram of an example computer system 800 operating in accordance with one or more aspects of the present disclosure. In various illustrative examples, example computer system 800 may be host computer 102, illustrated in FIG. 1. Example computer system 800 may be connected to other computer systems in a LAN, an intranet, an extranet, and/or the Internet. Computer system 800 may operate in the capacity of a server in a client-server network environment. Computer system 800 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 800 may include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which may communicate with each other via a bus 830.

Processing device 802 represents one or more general-purpose processing devices such as a microprocessor, central processing unit, or the like. More particularly, processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 may be configured to execute instructions implementing method 400 of low-latency cryptographic operations that use multiple keys, method 500 of cryptographic operations that use multiple keys in the instances where no precomputed block keys of a specific type are available, method 600 of using multiple initialization vectors during low-latency cryptographic operations that use multiple keys, and method 700 of precomputing block keys using multiple cryptographic keys for low-latency cryptographic operations.

Example computer system 800 may further comprise a network interface device 808, which may be communicatively coupled to a network 820. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 may include a computer-readable storage medium (or, more specifically, a non-transitory computer-readable storage medium) 828 on which is stored one or more sets of executable instructions 822. In accordance with one or more aspects of the present disclosure, executable instructions 822 may comprise executable instructions implementing method 400 of low-latency cryptographic operations that use multiple keys, method 500 of cryptographic operations that use multiple keys in the instances where no precomputed block keys of a specific type are available, method 600 of using multiple initialization vectors during low-latency cryptographic operations that use multiple keys, and method 700 of precomputing block keys using multiple cryptographic keys for low-latency cryptographic operations.

Executable instructions 822 may also reside, completely or at least partially, within main memory 804 and/or within processing device 802 during execution thereof by example computer system 800, main memory 804 and processing device 802 also constituting computer-readable storage media. Executable instructions 822 may further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
receiving, by a processing device, a first plurality of blocks of data;
identifying, by the processing device, that the first plurality of blocks of data is associated with a first cryptographic key;
selecting a first plurality of block keys from a memory store that comprises at least i) the first plurality of block keys computed using the first cryptographic key and ii) a second plurality of block keys computed using a second cryptographic key, wherein each of the first plurality of block keys and each of the second plurality of block keys were computed prior to receiving the first plurality of blocks of data; and
obtaining, by the processing device, a second plurality of blocks of data, wherein each of the second plurality of blocks of data is obtained using a cryptographic operation that involves a block of data of the first plurality of blocks of data and a block key of the first plurality of block keys.

2. The method of claim 1, further comprising:
responsive to identifying that the first plurality of blocks of data is associated with the first cryptographic key, initiating generation of a second plurality of block keys using the first cryptographic key.

3. The method of claim 2, further comprising:
storing the generated second plurality of block keys in the memory store.

4. The method of claim 2, wherein prior to receiving the first plurality of blocks of data, the memory store stores at least m×L block keys computed using the first cryptographic key, wherein m is a number of blocks of data in the first plurality of blocks of data and L is a number of cycles used to generate the second plurality of block keys.

5. The method of claim 1, further comprising:
updating a message authentication value using each of the second plurality of blocks of data.

6. The method of claim 5, wherein updating the message authentication value comprises:
retrieving a stored plurality of powers of a hash subkey; and
multiplying, in parallel, each of the second plurality of blocks of data by a corresponding one of the plurality of powers of the hash subkey.

7. The method of claim 1, further comprising:
receiving a third plurality of blocks of data;
identifying that the third plurality of blocks of data is associated with the second cryptographic key;
selecting the second plurality of block keys from the memory store; and
obtaining a fourth plurality of blocks of data, wherein each of the fourth plurality of blocks of data is obtained using the cryptographic operation that involves a block of data of the third plurality of blocks of data and a block key of the second plurality of block keys.

8. The method of claim 1, wherein the cryptographic operation is an encryption operation or a decryption operation, and wherein the cryptographic operation comprises bitwise XOR addition of the block of data and the block key.

9. The method of claim 1, further comprising:
receiving a third plurality of blocks of data;
identifying that the third plurality of blocks of data is associated with a third cryptographic key;
determining that the memory store does not store a block key computed using the third cryptographic key; and
buffering the third plurality of blocks of data in an input buffer.

10. The method of claim 1, further comprising:
receiving a third plurality of blocks of data;
identifying that the third plurality of blocks of data is associated with a third cryptographic key;
determining that the memory store does not store a block key computed using the third cryptographic key; and
using a fault notification to cause a replacement for the third plurality of blocks of data to be provided.

11. The method of claim 1, wherein each of the first plurality of block keys is obtained by an advanced encryption standard (AES) cipher and has a block key size of 128 bits.

12. The method of claim 1, wherein each of the first plurality of block keys was computed using the first cryptographic key and a first initialization vector, the method further comprising:
receiving a third plurality of blocks of data;
identifying that the third plurality of blocks of data is associated with the first cryptographic key;
determining that a number of previously received blocks of data associated with the first cryptographic key is at or above a threshold number;
selecting a third plurality of block keys from the memory store, wherein each of the third plurality of block keys was computed using the first cryptographic key and a second initialization vector; and
obtaining a fourth plurality of blocks of data, wherein each of the fourth plurality of blocks of data is obtained using the cryptographic operation that involves a block of data of the third plurality of blocks of data and a block key of the third plurality of block keys.

13. The method of claim 12, wherein the second initialization vector was obtained by incrementing the first initialization vector.

14. A system comprising:
a memory device; and
a processing device communicatively coupled to the memory device, wherein the processing device is configured to:
receive a first plurality of blocks of data;
identify that the first plurality of blocks of data is associated with a first cryptographic key;
select a first plurality of block keys from the memory device that comprises at least i) the first plurality of block keys computed using the first cryptographic key and ii) a second plurality of block keys computed using a second cryptographic key, wherein each of the first plurality of block keys and each of the second plurality of block keys were computed prior to receiving the first plurality of blocks of data; and
obtain a second plurality of blocks of data, wherein each of the second plurality of blocks of data is obtained using a cryptographic operation that involves a block of data of the first plurality of blocks of data and a block key of the first plurality of block keys.

15. The system of claim 14, wherein the processing device is further configured to:
- initiate, responsive to identifying that the first plurality of blocks of data is associated with the first cryptographic key, generation of a second plurality of block keys using the first cryptographic key; and
- store the generated second plurality of block keys in the memory device.

16. The system of claim 14, wherein prior to receiving the first plurality of blocks of data, the memory device stores at least m×L block keys computed using the first cryptographic key, wherein m is a number of blocks of data in the first plurality of blocks of data and L is a number of cycles used to generate the second plurality of block keys.

* * * * *